US011465467B2

(12) United States Patent
Greggs

(10) Patent No.: US 11,465,467 B2
(45) Date of Patent: Oct. 11, 2022

(54) APPARATUS AND METHODS FOR INHIBITING THE INGESTION OF SUDS BY THE HVAC SYSTEM OF A VEHICLE

(71) Applicant: Nissan North America, Inc., Franklin, TN (US)

(72) Inventor: Alan Greggs, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 113 days.

(21) Appl. No.: 17/252,919

(22) PCT Filed: Jun. 27, 2018

(86) PCT No.: PCT/US2018/039736
§ 371 (c)(1),
(2) Date: Dec. 16, 2020

(87) PCT Pub. No.: WO2020/005227
PCT Pub. Date: Jan. 2, 2020

(65) Prior Publication Data
US 2021/0260963 A1  Aug. 26, 2021

(51) Int. Cl.
*B60H 1/28* (2006.01)
(52) U.S. Cl.
CPC .................................... *B60H 1/28* (2013.01)
(58) Field of Classification Search
CPC ........... B60H 1/28; B60H 1/30; B62D 25/081

USPC .................................................. 454/147, 157
See application file for complete search history.

(56) References Cited

U.S. PATENT DOCUMENTS

| 7,275,985 B2 | 10/2007 | Lewis et al. |
| 2003/0183317 A1 | 10/2003 | Czaplicki et al. |
| 2012/0187723 A1 | 7/2012 | Bergholtz et al. |
| 2014/0017987 A1 | 1/2014 | Andersson |
| 2017/0232820 A1 | 8/2017 | Mitch et al. |

FOREIGN PATENT DOCUMENTS

| JP | H10316031 A | 12/1998 |
| JP | 2011240797 A | 12/2011 |
| JP | 2015151073 A | 8/2015 |

*Primary Examiner* — Jessica Yuen
(74) *Attorney, Agent, or Firm* — Young Basile Hanlon & MacFarlane, P.C.

(57) ABSTRACT

In one aspect of the present disclosure, a barrier is disclosed that is configured for connection to a vehicle dash assembly including an HVAC opening defined by a flange. The barrier includes a body that is configured to obstruct a flow of suds into the HVAC opening, and at least one clip that is supported on the body. The body includes open upper and rear portions to allow for continued airflow through the HVAC opening, and the at least one clip includes first and second clip members defining a receiving space therebetween that is configured to receive the flange such that the first and second clip members are positioned on opposite sides of the flange.

13 Claims, 8 Drawing Sheets

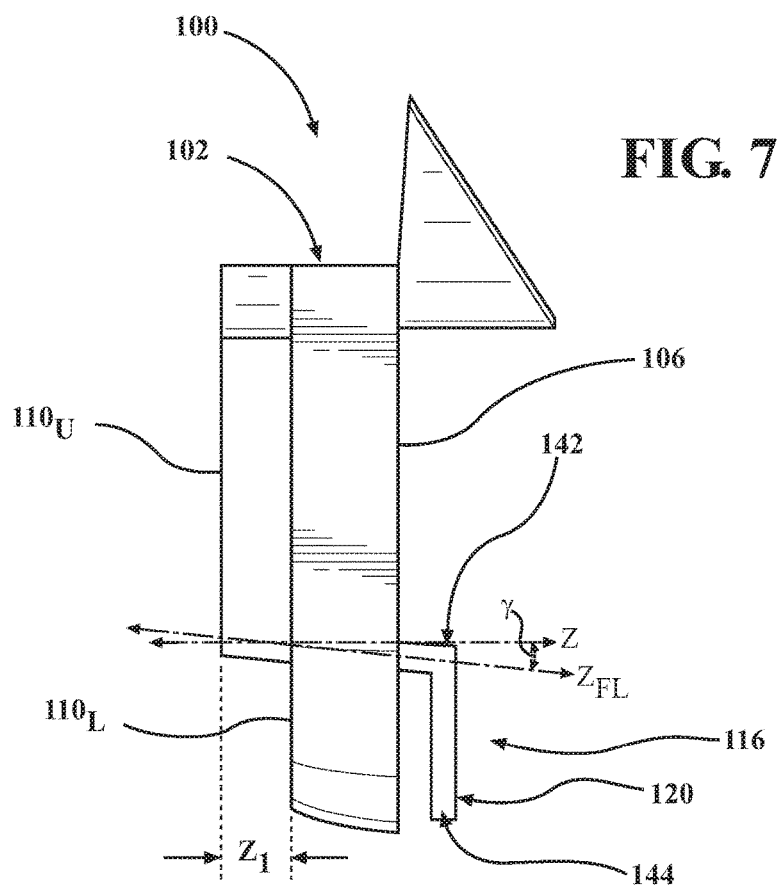
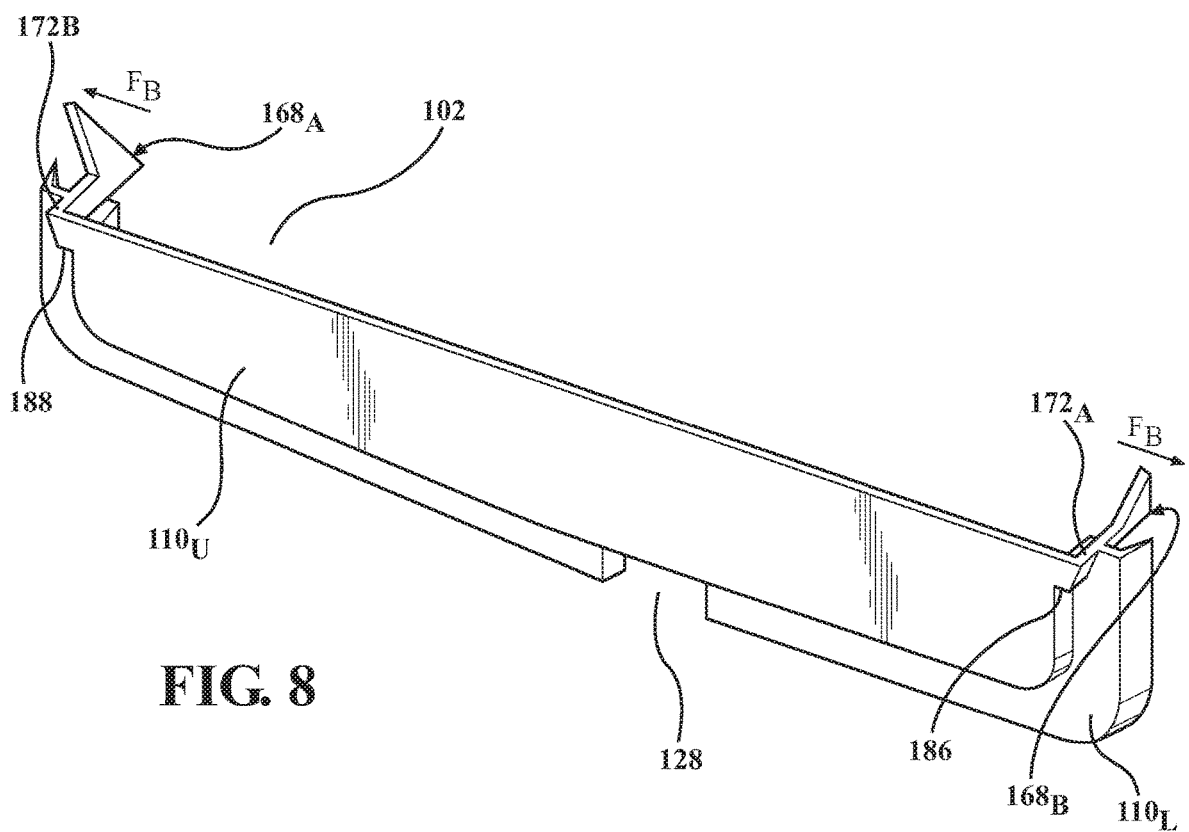

APPARATUS AND METHODS FOR INHIBITING THE INGESTION OF SUDS BY THE HVAC SYSTEM OF A VEHICLE

CROSS-REFERENCE TO RELATED APPLICATION(S)

This application is a national stage 371 application of PCT/US2018/039736, filed Jun. 27, 2018, the entire disclosure of which is hereby incorporated by reference.

TECHNICAL FIELD

The present disclosure relates to generally to vehicles, and more specifically, to apparatus and methods for inhibiting the ingestion of suds (e.g., soap or cleanser suds from a car wash) by the heating, ventilation, and air conditioning (HVAC) systems in vehicles.

BACKGROUND

Due to the amount of soap and other cleansers used in certain high-output and/or automated car washes, as a result of normal airflow, suds have been found to enter the HVAC systems of certain vehicles (and ultimately, the vehicle cabins) through the HVAC openings formed in the dash assembly. Apart from being generally undesirable, the flow of suds into an HVAC system may result in mechanical issues, such as, for example, HVAC motor burnout.

To address these concerns, the present disclosure describes a barrier that is configured for mounting adjacent to the HVAC opening to inhibit (or prevent) the flow of suds into the HVAC opening while maintaining sufficient airflow.

SUMMARY

In one aspect of the present disclosure, a barrier is disclosed that is configured for connection to a vehicle dash assembly including an HVAC opening defined by a flange. The barrier includes a body that is configured to obstruct a flow of suds into the HVAC opening, and at least one clip that is supported on the body. The body includes open upper and rear portions to allow for continued airflow through the HVAC opening, and the at least one clip includes first and second clip members defining a receiving space therebetween that is configured to receive the flange such that the first and second clip members are positioned on opposite sides of the flange.

In certain embodiments, the body may define a horizontal length extending along a first axis that is generally parallel in relation to the vehicle dash assembly, a vertical height extending along a second axis that is generally orthogonal in relation to the first axis, and a lateral width extending along a third axis that is generally orthogonal in relation to the first and second axes.

In certain embodiments, the body may include a lower body portion with a lower end wall and a lower sidewall, as well as an upper body portion with an upper end wall and an upper sidewall. The lower sidewall extends from the lower end wall along the third axis, and the upper sidewall extends from the upper end wall towards the lower end wall along the third axis.

In certain embodiments, the upper end wall may be spaced from the lower end wall along the third axis such that the upper end wall is positioned a first distance from the vehicle dash assembly and the lower end wall is positioned a second distance from the vehicle dash assembly, the second distance being less than the first distance.

In certain embodiments, the lower sidewall may include a variable thickness that tapers inwardly towards the vehicle dash assembly.

In certain embodiments, the lower sidewall may be discontinuous in configuration. For example, the lower sidewall may include first and second segments that are positioned on opposite sides of the at least one clip.

In certain embodiments, the first and second clip members may be configured to engage the flange to restrict movement of the barrier along one or more of the first, second, and third axes.

In certain embodiments, the second clip member may be configured for resilient deflection from an initial configuration to a subsequent configuration such that the at least one clip applies a force to the flange to secure the at least one clip to the flange.

In certain embodiments, the second clip member may include a first leg extending in a first direction and a second leg depending from the first leg such that the second leg extends in a second direction transverse (e.g., orthogonal) in relation to the first direction.

In certain embodiments, the second leg may be deflectable in relation to the first leg.

In certain embodiments, the first clip member may include an upper engagement member and a lower engagement member. In such embodiments, the upper and lower engagement members may define beveled surfaces.

In certain embodiments, the beveled surfaces defined by the upper and lower engagement members may extend along intersecting axes in correspondence with a contour defined by the flange to facilitate receipt of the flange within the receiving space.

In certain embodiments, the body may include an internal stiffener that extends inwardly from the upper end wall towards the HVAC opening in the vehicle dash assembly.

In certain embodiments, the internal stiffener and the lower sidewall may define a channel that is configured to receive the flange to restrict movement of the flange along one or more of the first, second, and third axes.

In certain embodiments, the channel may be generally U-shaped in configuration.

In certain embodiments, the channel may define opposite ends that taper outwardly towards the lower sidewall such that the ends of the channel receive the flange in an interference fit.

In another aspect of the present disclosure, a method is disclosed for inhibiting suds ingestion by a vehicle's HVAC system through an HVAC opening formed in the vehicle dash assembly. The method includes securing a barrier to a flange defining the HVAC opening to obstruct a flow of suds into the HVAC opening. To maintain airflow through the HVAC opening, the barrier includes a body having an open upper portion and an open rear portion.

In certain embodiments, securing the barrier to the flange may include releasably securing the barrier to the flange.

In certain embodiments, securing the barrier to the flange may include connecting at least one clip to the flange. In such embodiments, the at least one clip may be supported on the body of the barrier.

In certain embodiments, connecting the at least one clip to the flange may include positioning first and second clip members on opposite sides of the flange such that the flange is positioned within a receiving space defined between the first and second clip members.

In certain embodiments, securing the barrier to the flange may include positioning the flange within an interior channel defined by the body, the channel extending along a perimeter of the barrier.

In certain embodiments, positioning the flange within the interior channel may include creating an interference fit between the flange and tapered end portions of the channel.

BRIEF DESCRIPTION OF THE DRAWINGS

The invention is best understood from the following detailed description when read in conjunction with the accompanying drawings. It is emphasized that, according to common practice, the various features of the drawings may not be to scale and may be arbitrarily expanded or reduced for clarity.

FIG. 7 is a side, plan view of the barrier;

FIG. 8 is a top, front perspective view of the barrier;

DETAILED DESCRIPTION

The present disclosure describes a barrier that is configured for mounting adjacent to the HVAC opening formed in the dash assembly of a vehicle to inhibit (or prevent) suds (e.g., from the soap or cleanser used in a car wash) from being drawn into the HVAC system and/or the cabin of the vehicle. The barrier creates space between the suds and the HVAC opening to inhibit (or prevent) ingestion of the suds, and includes open upper and rear portions to maintain sufficient airflow through the HVAC opening and into the HVAC system. In various embodiments, it is envisioned that the barrier may be either fixedly or removably connected to the vehicle dash assembly. For example, as discussed in detail below, the barrier may include one or more clips that are configured for engagement with the vehicle dash assembly (e.g., with a flange defining the HVAC opening).

Figure 1:
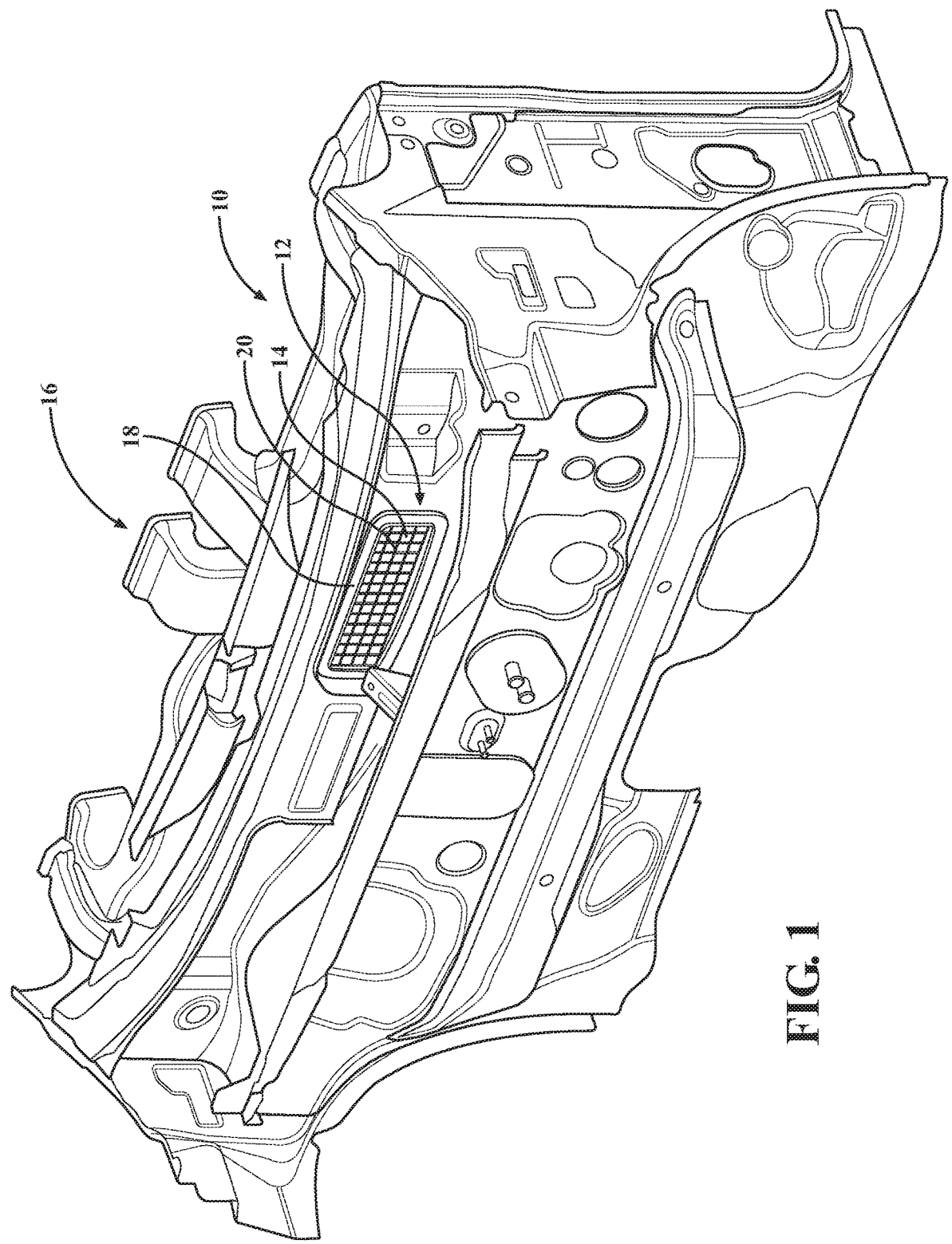
FIG. 1 is a front, perspective view of the dash assembly of a vehicle including an HVAC opening.
Figure 2:
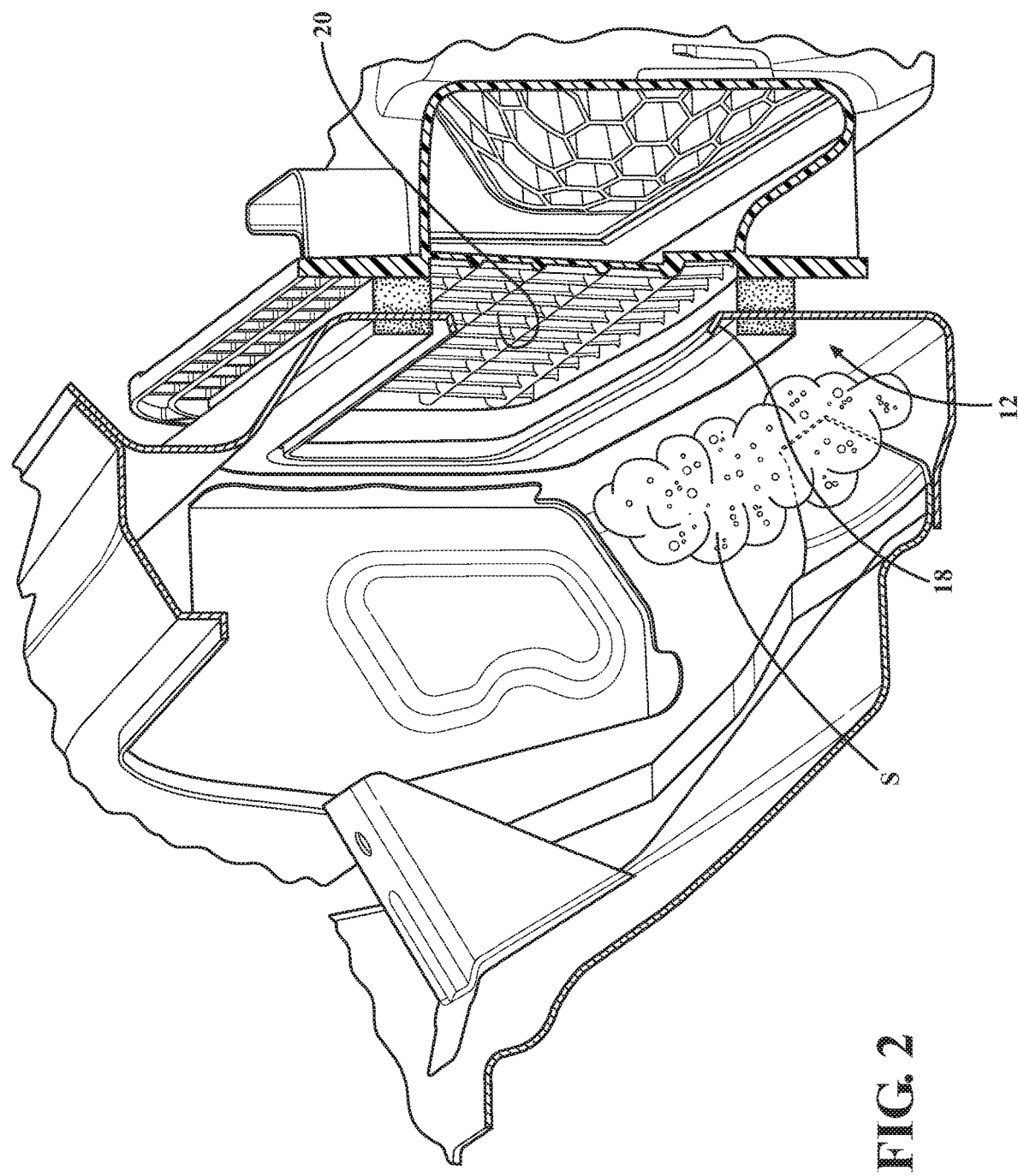
FIG. 2 is a partial, cross-sectional view of the dash assembly taken through the HVAC opening along line 2-2 in FIG. 1.

FIGS. 1 and 2 generally illustrate a vehicle dash assembly 10. Although shown in a particular configuration for use in a particular vehicle (i.e., a Nissan Rogue), it should be appreciated that the principles of the present disclosure may find wide applicability in connection with a variety of vehicles. The dash assembly 10 includes a dash wall 12 (e.g., formed from sheet metal) with an HVAC opening 14 that allows for airflow into an HVAC system 16 of the vehicle and, ultimately, into the vehicle's cabin. The HVAC opening 14 is defined by a flange 18 that extends outwardly from the dash wall 12 towards a front end of the vehicle. In the illustrated embodiment, the HVAC opening 14 includes a grille 20 to inhibit (or prevent) objects, such as leaves, debris, etc., from passing through the HVAC opening 14 and entering the HVAC system 16 and/or the cabin of the vehicle.

With reference now to FIGS. 3-8 as well, a barrier 100 is shown that is configured for mounting adjacent to the HVAC opening 14 to inhibit (or prevent) suds S (FIGS. 2, 3) from passing through the HVAC opening 14 and entering the HVAC system 16 and/or the cabin of the vehicle. The barrier 100 may include (e.g., may be formed from) any heat-resistant material suitable for the intended purpose of limiting, if not entirely preventing, suds S from passing through the HVAC opening 14 while maintaining sufficient airflow into the HVAC system 16. For example, the barrier 100 may include (e.g., may be formed from) plastics, polypropylene, polyvinyl chloride (PVC), polymers, metallic materials, etc., either exclusively or in combination. The barrier 100 may be formed through any suitable method of manufacture, including, for example, injection molding, die casting, 3-D printing, etc.

Figure 3:
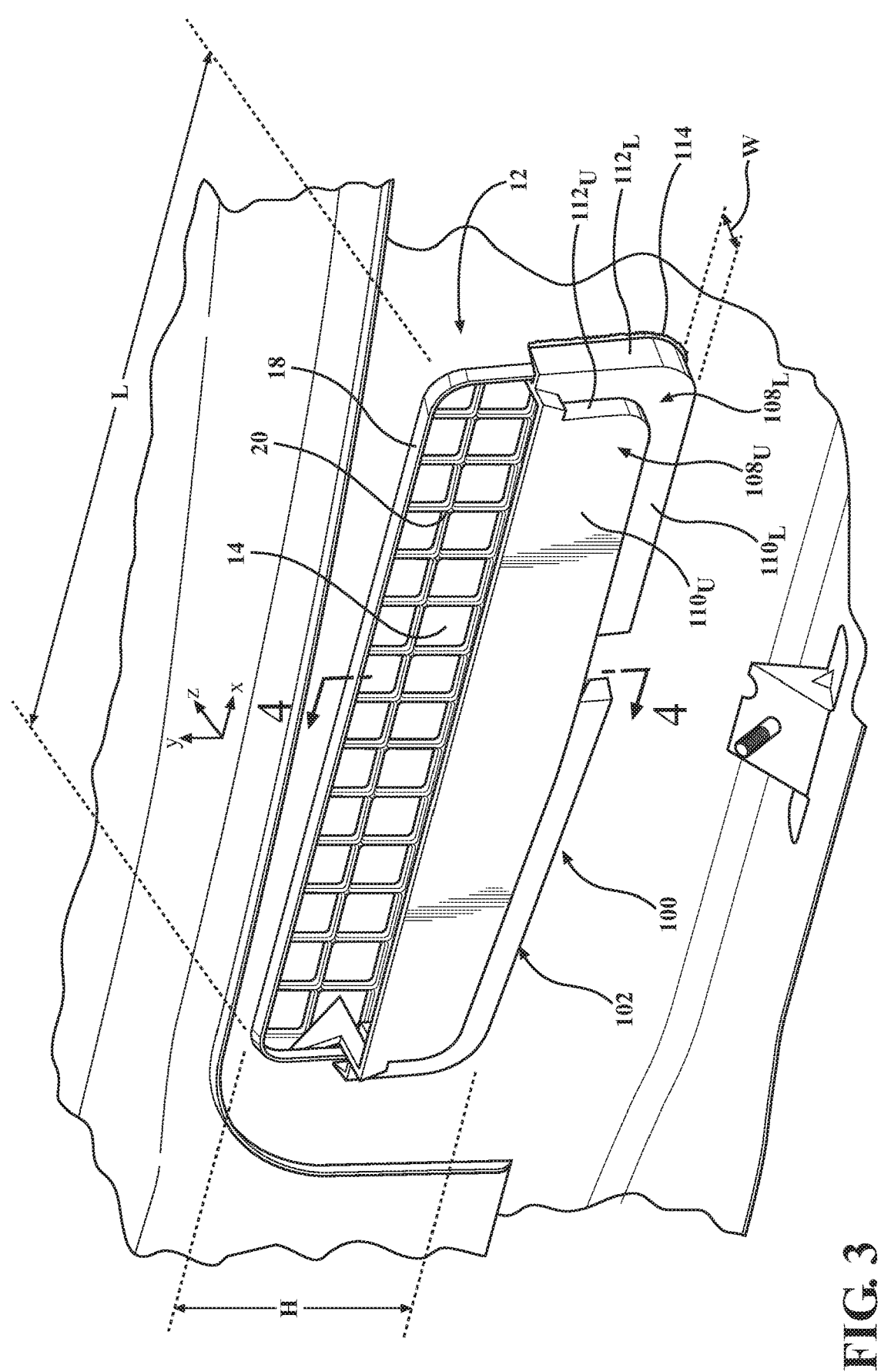
FIG. 3 is a partial, front, perspective view of the HVAC opening in the dash assembly together with a barrier according to the principles of the present disclosure.

As seen in FIG. 3, the barrier 100 generally corresponds in configuration to that defined by the HVAC opening 14, and includes a body 102 with open upper and rear portions 104, 106, respectively. The body 102 defines a length L extending along a first axis X that is generally parallel in relation to the dash assembly 10, a vertical height H extending along a second axis Y that is generally orthogonal in relation to the X-axis, and a lateral width W extending along a third axis Z that is generally orthogonal in relation to the X-axis and the Y-axis. In the particular embodiment illustrated throughout the figures, the barrier 100 is configured such that the length L lies substantially within the range of approximately 200 mm to approximately 300 mm, the height H lies substantially within the range of approximately 50 mm to approximately 75 mm, and the width W lies substantially within the range of approximately 20 mm to approximately 40 mm to facilitate use with the particular vehicle represented in the figures. In various embodiments, however, it is envisioned that the length L, the height H, and/or the width W of the barrier 100 may be altered or varied to facilitate use of the barrier 100 in connection with other vehicles.

The body 102 includes respective upper and lower body portions $108_U$, $108_L$, each having an end wall 110 extending along the X-axis and a sidewall 112 extending from the end wall 110 along the Z-axis. More specifically, the upper body portion $108_U$ includes an upper end wall $110_U$ and an upper sidewall $112_U$, and the lower body portion $108_L$ includes a lower end wall $110_L$ and a lower sidewall $112_L$. The upper end wall $110_U$ is spaced from the lower end wall $110_L$ by a distance $Z_1$ (FIG. 7) such that the lower end wall $110_L$ is spaced a first distance from the HVAC opening 14 and the upper end wall $110_U$ is spaced a second, greater distance from the HVAC opening 14. By varying the dimensions of the upper sidewall $112_U$, and, thus, the distance $Z_1$, the dimensions of the open upper portion 104 can be altered as desired to increase or decrease separation between the upper end wall $110_U$ and the HVAC opening 14 to thereby vary airflow into the HVAC opening 14 through the open upper and rear portions 104, 106, respectively.

As seen in FIG. 7, the body 102 may be configured such that the end walls $110_U$, $110_L$ extend in generally parallel relation to each other, and to the vertical Y-axis, to reduce the overall width W of the body 102 (e.g., to accommodate various components of the vehicle, such as windshield wiper motors, for example). Alternatively, however, it is envisioned that one or more of the end walls $110_U$, $110_L$ may extend at an angle to the vertical Y-axis to increase the overall width W of the body 102, and, thus, the dimensions of the open upper portion 104, to increase airflow into the HVAC opening 14 (FIGS. 1-3).

Although the end walls $110_U$, $110_L$ are shown as being generally planar in the embodiment illustrated throughout the figures, in alternate embodiments, either or both of the end walls $110_U$, $110_L$ may be non-planar in configuration (e.g., to provide increased clearance for various components of the vehicle).

As seen in FIGS. 5 and 8-10, for example, in one embodiment, it is envisioned that the lower sidewall $112_L$ may include a variable thickness T that tapers inwardly (i.e., towards the HVAC opening 14 (FIGS. 1-3) and away from the lower end wall $110_L$). The variable thickness T of the lower sidewall $112_L$ facilitates installation of the barrier 100 and engagement with the dash wall 12 in an interference fit (discussed in further detail below) such that the barrier 100 forms a seal with the dash wall 12. Engagement of the lower sidewall $112_L$ with the dash wall 12 also inhibits relative movement between the barrier 100 and the dash wall 12 along one or more of the X, Y, and Z-axes.

In alternate embodiments of the disclosure, the barrier 100 may optionally include one or more sealing members 114 (FIG. 3), either in addition to, or instead of, the tapered configuration of the lower sidewall $112_L$ to form the aforementioned seal between the barrier 100 and the dash wall 12. For example, the sealing member(s) 114 may include a foam seal with an adhesive backing, a double-sided adhesive strip, a variable durometer dual-shot material, etc. As such, in one embodiment, it is envisioned that the barrier 100 may include the tapered lower sidewall $112_L$ and the sealing member(s) 114, as seen in FIG. 3, whereas in an alternate embodiment, the lower sidewall $112_L$ may be devoid of the aforedescribed tapering such that the lower sidewall $112_L$ defines a uniform thickness T. It is further envisioned that, in certain embodiments, rather than being releasably connectable to the dash wall 12, the barrier 100 may be fixed to the dash wall 12 (e.g., via welding), as discussed in further detail below.

With particular reference to FIGS. 4 and 7-11 in particular, the barrier 100 includes one or more clips 116 that are supported by the body 102 to facilitate releasable connection of the barrier 100 to the dash assembly 10. Although illustrated as including a single clip 116 in the embodiment shown throughout the figures, in alternate embodiments of the barrier 100, one or more additional clips 116 may be included. While the clip 116 is shown as being positioned in a generally off-center location in the illustrated embodiment, in alternate embodiments, the particular location of the clip 116 on the body 102 of the barrier 100 may be varied (e.g., depending upon the particular configuration and layout of the dash assembly 10, the HVAC opening 14, etc.) without departing from the scope of the present disclosure.

Figure 4:
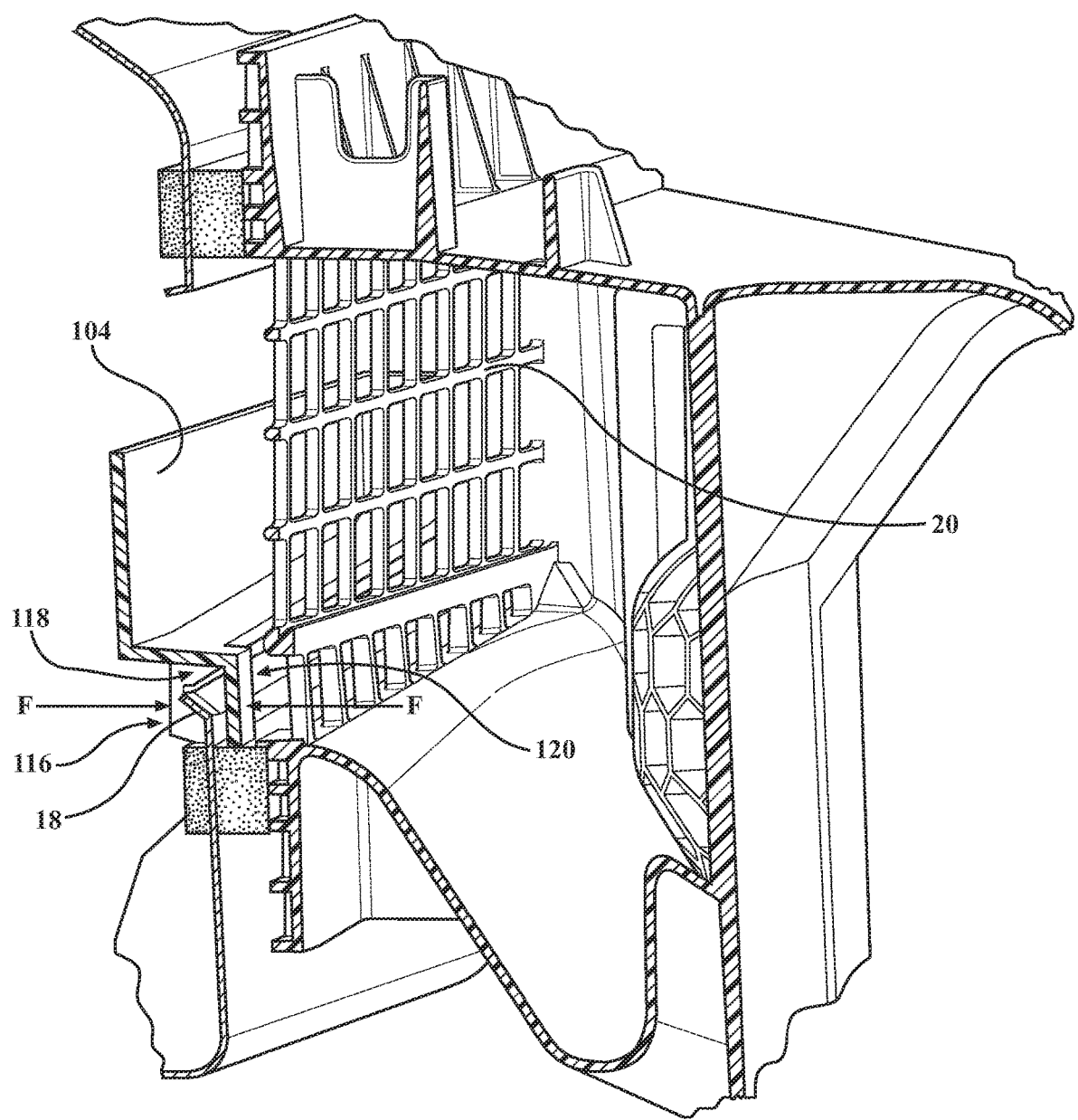
FIG. 4 is a partial, cross-sectional view of the dash assembly taken through the HVAC opening and the barrier along line 4-4 in FIG. 3.
Figure 5:
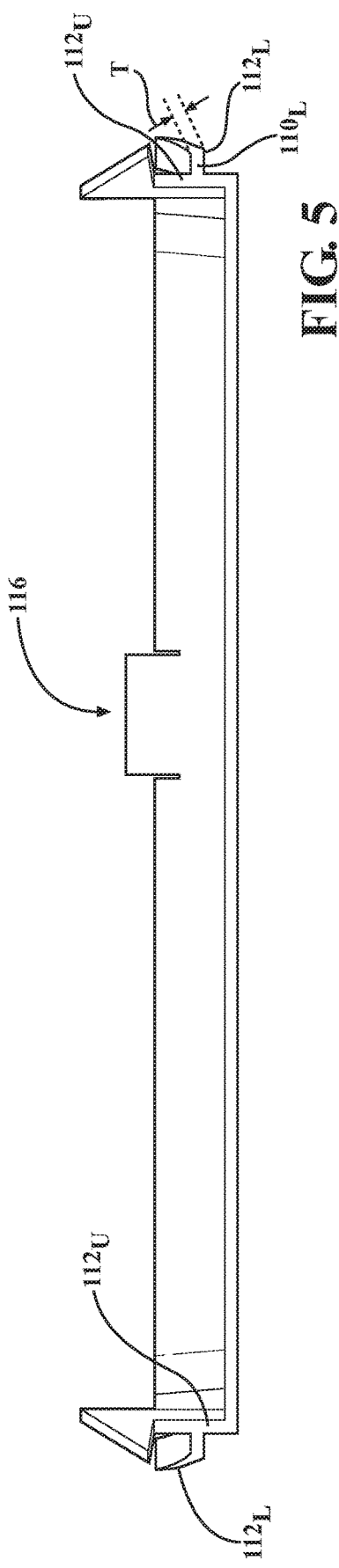
FIG. 5 is a partial, top, plan view of the dash assembly and the barrier.
Figure 6:
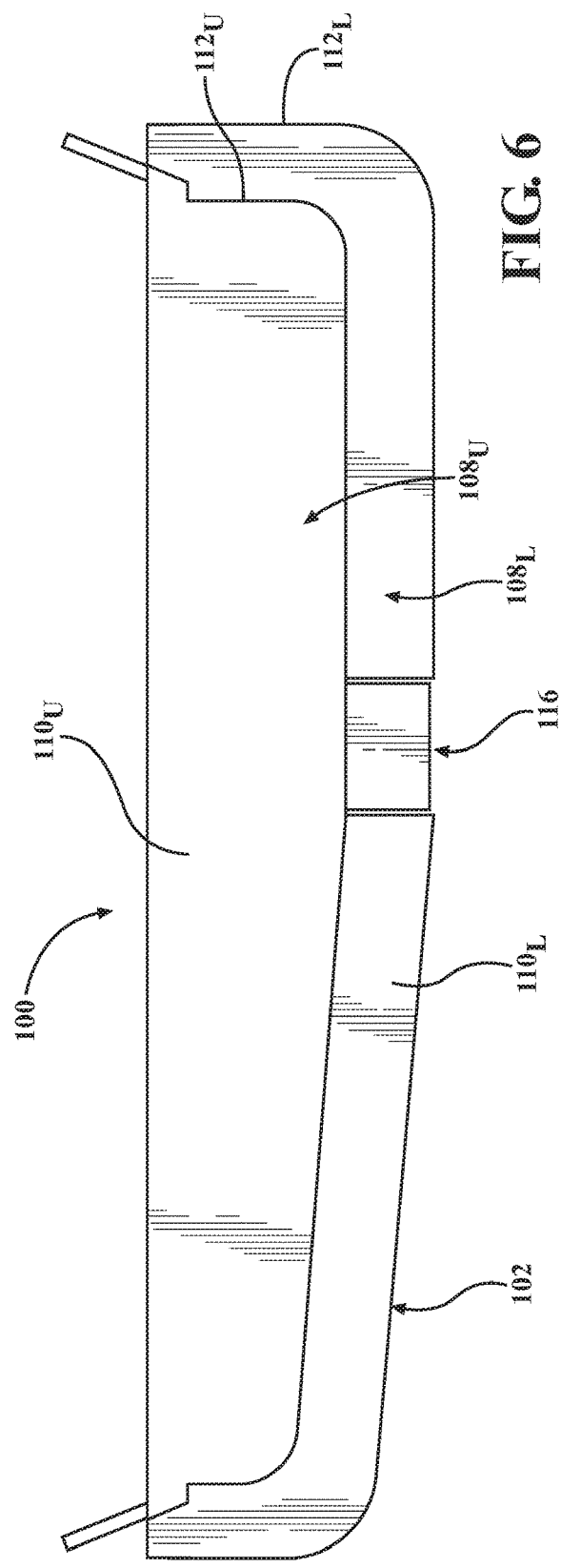
FIG. 6 is a front, plan view of the barrier.

The clip 116 is formed from a resiliently deflectable material, which may be either the same material used in the manufacture of the remainder of the barrier 100, or a different material. The clip 116 includes respective first and second clip members 118, 120 that cooperate to secure the barrier 100 to the flange 18 and divide the lower sidewall $112_L$ into respective first and second segments 122, 124 (FIGS. 9, 11) that are positioned on opposite (left and right) sides of the clip 116 such that the lower sidewall $112_L$ is discontinuous in configuration. The clip members 118, 120 collectively define a receiving space 126 configured as a recess 128 (FIG. 8) that receives the flange 18 such that the clip members 118, 120 are positioned on opposite (front and rear) sides of the flange 18, as seen in FIG. 4. Via engagement with the flange 18, the clip 116 restricts (or prevents) movement of the barrier 100 in relation to the dash wall 12 along the one or more of the X, Y, and Z-axes (FIG. 3). In particular, it is envisioned that engagement of the clip 116 with the flange 18 will restrict (or prevent) relative movement along the Z-axis (i.e., forward and rearward movement of the barrier 100). However, depending upon manufacturing tolerances, the particular configuration of the flange 18, etc., it is envisioned that engagement of the clip 116 with the flange 18 may also restrict (or prevent) lateral movement of the barrier 100 along the X-axis (i.e., side-to-side movement) and/or vertical movement of the barrier 100 along the Y-axis.

The first clip member 118 includes lateral clip portions 130, 132 that are positioned on opposite (left and right) sides of the second clip member 120. The clip portions 130, 132 are identical in configuration, so in the interest of clarity and brevity, only the clip portion 130 will be discussed.

The clip portion 130 includes respective upper and lower engagement members $134_U$, $134_L$ (FIG. 10) that extend inwardly (rearwardly) from the lower end wall $110_L$. In the illustrated embodiment, the upper engagement member $134_U$ extends vertically upward along the Y-axis (FIG. 3) so as to intersect an internal stiffener 140 included on the body 102 (discussed in further detail below), and the lower engagement member $134_L$ extends vertically downward along the Y-axis (FIG. 3) so as to intersect the lower sidewall $112_L$. The engagement members $134_U$, $134_L$ define beveled surfaces $136_U$, $136_L$ (FIG. 10), respectively, that are configured in correspondence with the contour defined by the flange 18. As such, in the illustrated embodiment, the beveled surfaces $136_U$, $136_L$ extend along intersecting axes $A_1$, $A_2$ that respectively subtend angles α, β with the Z-axis. Although illustrated as each being approximately 45° throughout the figures, the values of the angles α, β may be varied in alternate embodiments without departing from the scope of the present disclosure (e.g., depending on the particular configuration of the flange 18). As such, embodiments are envisioned in which the angles α, β may be dissimilar.

The engagement member $134_U$ includes an end wall $138_U$ (FIG. 10) that extends between the beveled surface $136_U$ and the internal stiffener 140, and the engagement member $134_L$ includes an end wall $138_L$ that extends between the beveled surface $136_L$ and the lower sidewall $112_L$. Although shown as being generally planar in configuration, and as extending in generally parallel relation to the Y-axis (FIG. 3) throughout the figures, in alternate embodiments, the specific configuration and/or orientation of the end walls $138_U$, $138_L$ may be varied. For example, the end walls $138_U$, $138_L$ may include an arcuate (rounded) configuration, or the end walls $138_U$, $138_L$ may each extend at an angle in relation to the Y-axis, which may be either identical or dissimilar.

In alternate embodiments, depending on the particular configuration of the clip 116, the flange 18, etc., the engagement members $134_U$, $134_L$ may be devoid of the end walls $138_U$, $138_L$ such that the beveled surfaces $136_U$, $136_L$ extend directly into the internal stiffener 140 and the lower sidewall $112_L$, respectively.

The second clip member 120 is configured to cooperatively engage the flange 18 with the first clip member 118 so as to apply an inwardly-directed force "F" (FIG. 4) to the flange 18 to secure the flange 18 within the receiving space 126. The second clip member 120 includes a first leg 142 (FIGS. 7, 10) extending along a first axis $Z_{FL}$ (in a first direction) and a second leg 144 depending from the first leg 142 so as to extend along a second axis $Z_{SL}$ (in a second direction) that is transverse in relation to the first axis $Z_{FL}$. In the particular embodiment of the second clip member 120 illustrated throughout the figures, the legs 142, 144 are oriented in generally orthogonal relation such that the axes $Z_{FL}$, $Z_{SL}$ subtend an angle of approximately 90°. In alternate embodiments, however, it is envisioned that relative orientations of the legs 142, 144 may be altered or varied (e.g., such that the axes $Z_{FL}$, $Z_{SL}$ subtend an angle that is less than 90° or greater than 90°).

As seen in FIG. 7, in the particular embodiment illustrated, the second clip member 120 is configured such that the first leg 142 extends in non-parallel relation to the Z-axis. More specifically, the first leg 142 is oriented at a slightly downward angle so as to subtend an angle γ between the first axis $Z_{FL}$ and the Z-axis. While it is envisioned that the angle γ may lie substantially within the range of approximately 5° to 20°, in alternate embodiments of the disclosure, the particular arrangement of the legs 142, 144 may be varied to achieve any desirable value for the angle γ. At the intersection of the legs 142, the second clip member 120 defines an outer bearing edge 146, the functionality of which is discussed in further detail below.

In the particular embodiment of the barrier 100 illustrated in the figures, the second clip member 120 is positioned such that the first leg 142 defines an upper surface 148 that is generally coplanar (flush) with an upper surface 150 defined by the internal stiffener 140. In alternate embodiments, however, the particular location of the second clip member 120 may be varied without departing from the scope of the present disclosure.

Although shown as being generally planar in configuration in the illustrated embodiment, in alternate embodiments, the second leg 144 may be non-planar in configuration. For example, the second leg 144 may define an arcuate outer profile.

Figure 9:
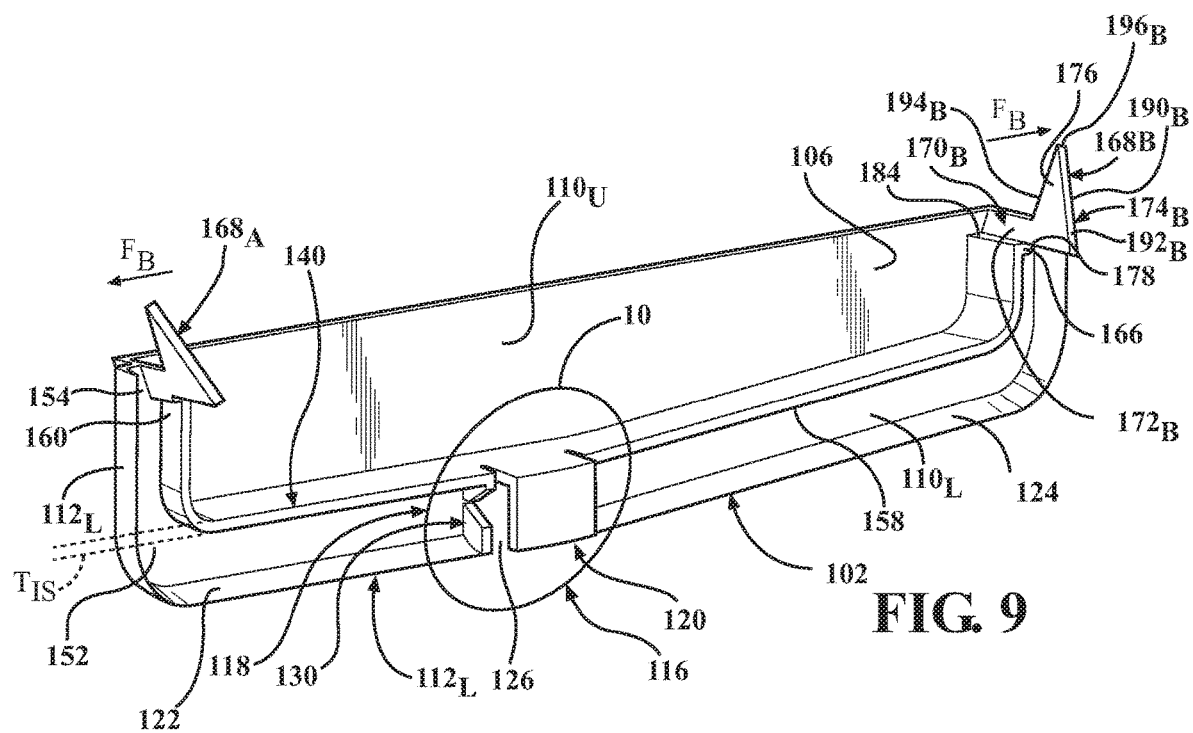
FIG. 9 is a top, left, rear perspective view of the barrier.
Figure 10:
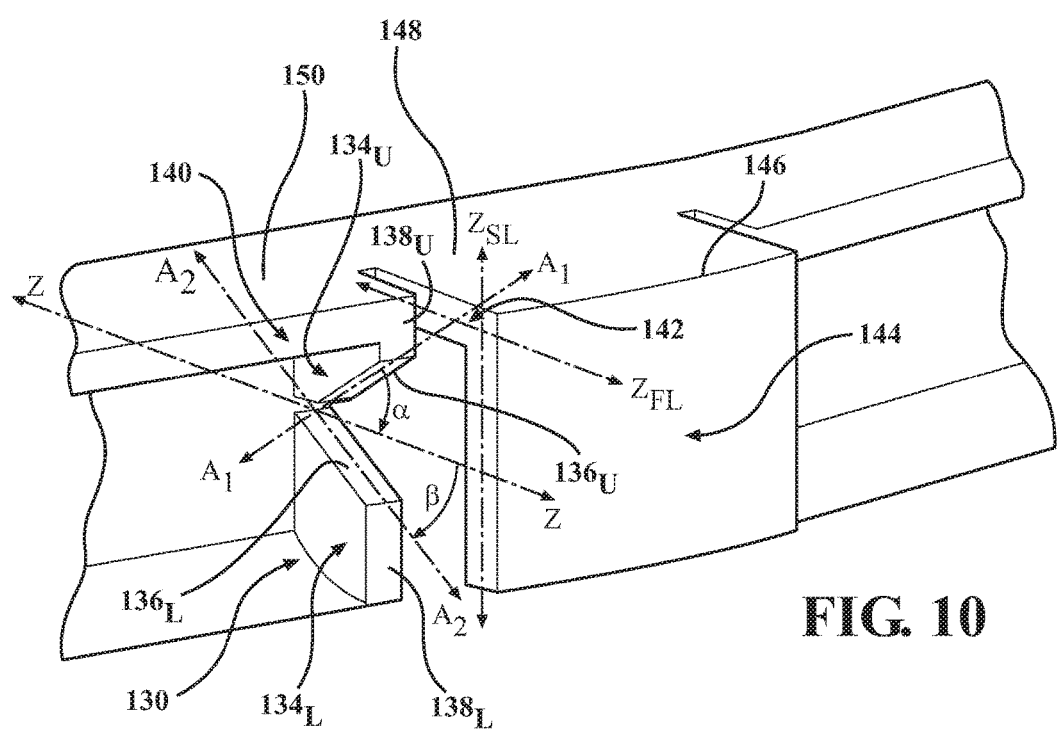
FIG. 10 is an enlargement of the area of detail indicated in FIG. 9.
Figure 11:
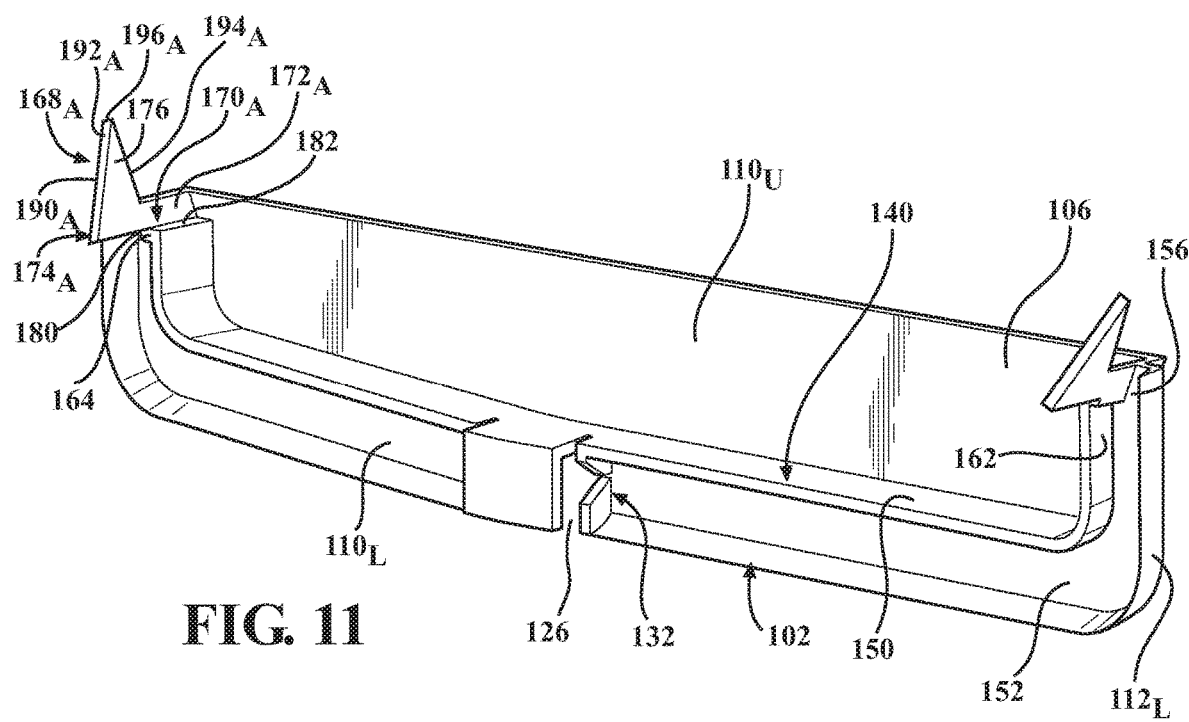
FIG. 11 is a top, right, rear perspective view of the barrier.

With reference now to FIGS. 9-11, the internal stiffener 140 will be discussed. The internal stiffener 140 is configured to add rigidity to the body 102 of the barrier and extends inwardly (rearwardly) from the upper end wall $110_U$ towards the HVAC opening 14 (FIGS. 1-3). The internal stiffener 140 collectively defines an internal channel 152 with the lower end wall $110_L$ that has opposite upper ends 154, 156. The internal stiffener 140 defines a thickness $T_{IS}$ that lies substantially within the range of approximately 5 mm to approximately 25 mm, although a thickness $T_{IS}$ outside this range would not be beyond the scope of the present disclosure. In the illustrated embodiment, the internal stiffener 140 is positioned in general correspondence with the intersection of the upper body portion $108_U$ and the lower body portion $108_L$ such that the upper sidewall $112_U$ extends through the upper end wall $110_U$ so as to define a lower surface 158 of the internal stiffener 140. In alternate embodiments, however, the particular location of the internal stiffener 140 may be varied (e.g., depending upon the particular configurations and locations of the components of the vehicle).

The internal stiffener 140 extends along a perimeter of the body 102 and is configured in general correspondence with the configuration of the body 102 of the barrier 100. As such, in the illustrated embodiment, the internal stiffener 140 (and, thus, the internal channel 152) is generally U-shaped in configuration. The internal stiffener includes opposite upper ends 160, 162 that define transverse shoulders 164, 166, respectively. The transverse shoulders 164, 166, respectively, support brackets $168_A$, $168_B$ that extend inwardly from the body 102 towards the HVAC opening 14 (FIGS. 1-3).

The brackets $168_A$, $168_B$ are configured for engagement with the grille 20 (FIG. 4) to further secure the barrier 100 in relation to the HVAC opening 14. The brackets $168_A$, $168_B$ include first portions $170_A$, $170_B$ that are generally configured as linear extensions $172_A$, $172_B$, and second portions $174_A$, $174_B$ that are generally configured as triangular hooks $176_A$, $176_B$ that extend vertically upward from the extensions $172_A$, $172_B$, respectively. On a rear side of the barrier 100, the extensions $172_A$, $172_B$ are supported adjacent to ends 178, 180 of the shoulders 164, 166, respectively, so as to define a first pair of (upward-facing) ledges 182, 184 (FIGS. 9, 11), and on a front side of the barrier 100, the extensions $172_A$, $172_B$ extend beyond the lower end wall $110_L$ so as to define a second pair of (downward-facing) ledges 186, 188 (FIG. 8). The extensions $172_A$, $172_B$ are angled towards the lower sidewall $112_L$ such that the brackets $168_A$, $168_B$ define outer bearing surfaces $190_A$, $190_B$, respectively. The outer bearing surfaces $190_A$, $190_B$ extend in opposite directions relative to the vertical Y-axis so as to narrow the upper ends 154, 156 of the channel 152, and facilitate inward deflection of the brackets $168_A$, $168_B$ along the X-axis during placement of the barrier 100, as discussed in further detail below. Depending upon the particular configurations and orientations of the brackets $168_A$, $168_B$, it is envisioned that the upper ends 154, 156 of the channel 152 may be narrowed to such an extent that the flange 18 is positionable between the outer bearing surfaces $190_A$, $190_B$ and the lower sidewall $112_L$ so as to restrict (or prevent) relative movement between the barrier 100 and the dash wall 12 along one or more of the X, Y, and Z-axes (FIG. 3). For example, it is envisioned that the flange 18 may be received between the outer bearing surfaces $190_A$, $190_B$ and the lower sidewall $112_L$ in an interference fit.

The second portion $174_A$ of the bracket $168_A$ defines a first (rear) beveled surface $192_A$ that is tapered towards the end walls $110_U$, $110_L$ (and, thus, away from the HVAC opening 14), and a second (front) surface $194_A$ that intersects the first surface $192_A$ at an apex $196_A$. Similarly, the second portion $174_B$ of the bracket $168_B$ defines a first (rear) beveled surface $192_B$ that is tapered towards the end walls $110_U$, $110_L$ (and, thus, away from the HVAC opening 14), and a second (front) surface $194_B$ that intersects the first surface $192_B$ at an apex $196_B$. In the illustrated embodiment, the surfaces $194_A$, $194_B$ are illustrated as extending in generally parallel relation to the Y-axis (FIG. 3). In alternate embodiments, however, it is envisioned that the surfaces $194_A$, $194_B$ may each extend at an angle in relation to the Y-axis.

With reference now to FIGS. 1-11, installation and removal of the barrier 100 will be discussed. Initially, the barrier 100 is oriented such that the flange 18 is generally positioned in correspondence with the channel 152 (FIGS. 9, 11), and the clip 116 is pressed into engagement with the flange 18. More specifically, the flange 18 is positioned within the receiving space 126 defined between the clip members 118, 120 such that the clip member 120 is positioned rearwardly of the flange 18 between the flange 18 and the grille 20. As the flange 18 is inserted into the receiving space 126, the bearing edge 146 (FIGS. 9, 11) defined at the intersection of the legs 142, 144 engages the dash wall 12 such that the second clip member 120 is deflected towards the first clip member 118 to move the clip 116 from an initial (undeflected) configuration into a subsequent (deflected) configuration. Deflection of the second clip member 120 applies the force "F" (FIG. 4) to the flange 18 to restrict movement of the barrier 100 along one or more of the X, Y, and Z-axes. It is envisioned that the subsequent (deflected)

configuration of the clip 116 and, thus, the force "F" may be maintained via continued engagement of the bearing edge 146 and the dash wall 12.

Concomitant with deflection of the second clip member 120, the lower sidewall $112_L$ is deflected outwardly (i.e., away from the upper body portion $108_U$) via engagement with the dash wall 12. As the lower sidewall $112_L$ is deflected, an interference fit is created with the dash wall 12 to further restrict movement of the barrier 100 along one or more of the X, Y, and Z-axes. Depending upon the particular dimensions of the barrier 100 (e.g., the lower sidewall $112_L$), it is envisioned that the lower sidewall $112_L$ may sealingly engage the dash wall 12.

As the barrier 100 is advanced towards the HVAC opening 14, the brackets $168_A$, $168_B$ engage the grille 20 in an initial (undeflected) configuration such that the grille 20 acts upon the bearing surfaces $190_A$, $190_B$ to deflect the brackets $168_A$, $168_B$ inwardly towards one another. In various embodiments, the angle at which the extensions $172_A$, $172_B$ extend in relation to the lower sidewall $112_L$ may be varied to alter the extent to which the brackets $168_A$, $168_B$ are deflected (i.e., increasing the angle will increase deflection of the brackets $168_A$, $168_B$, and vice versa). As the brackets $168_A$, $168_B$ are deflected inwardly into a subsequent (deflected) configuration, an outwardly directed biasing force $F_B$ (FIGS. 4, 8) is created in the brackets $168_A$, $168_B$. The biasing force $F_B$ returns the brackets $168_A$, $168_B$ to the initial (undeflected) configuration as the respective second portions $174_A$, $174_B$ of the brackets $168_A$, $168_B$ are advanced past the grille 20 such that the second (front) surfaces $194_A$, $194_B$ engage the grille 20 to further restrict movement of the barrier 100 along one or more of the X, Y, and Z-axes.

Following placement of the barrier 100, as seen in FIG. 3, the end wall $110_U$ of the upper body portion $108_U$ guards against the ingestion of suds S into the HVAC opening 14. The respective open upper and rear portions 104, 106, however, allow for airflow through the HVAC opening 14 past the barrier 100.

To remove the barrier 100 from the flange 18, the brackets $168_A$, $168_B$ are deflected inwardly to allow for disengagement of the second (front) surfaces $194_A$, $194_B$ from the grille 20. Thereafter, the brackets $168_A$, $168_B$ can be removed from the grille 20 and allowed to return to the initial configuration by the biasing force $F_B$ created during inward deflection. Thereafter, the clip 116 can be disengaged from the flange 18 by manipulating the barrier 100 to again cause outward (rearward) deflection of the second clip member 120. Once the clip 116 is freed from engagement with the flange 18, the second clip member 120 is allowed to return to the initial configuration by virtue of the resilient material comprising the clip 116. The flange 18 can then be removed from the channel 152 to complete removal of the barrier 100.

In an alternate method of installation, after positioning the barrier 100 such that the flange 18 is positioned within the receiving space 126 and the channel 152 in the manner described above, the barrier 100 may be fixedly connected to the dash wall 12. For example, the barrier 100 may be welded to the dash wall 12.

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure, and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," etc., should be understood to describe a relative relationship between structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Each and every claim is incorporated as further disclosure into the specification, and represents embodiments of the present disclosure. Also, the phrases "at least one of A, B, and C" and "A and/or B and/or C" should each be interpreted to include only A, only B, only C, or any combination of A, B, and C.

What is claimed is:

1. A barrier connectable to a vehicle dash assembly including an HVAC opening defined by a flange, the barrier comprising:
  a body configured to obstruct a flow of suds into the HVAC opening, the body including open upper and rear portions to allow for continued airflow through the HVAC opening, wherein the body defines a horizontal length extending along a first axis generally parallel in relation to the vehicle dash assembly, a vertical height extending along a second axis generally orthogonal in relation to the first axis, and a lateral width extending along a third axis generally orthogonal in relation to the first and second axes, the body comprising:

a lower body portion including a lower end wall and a lower sidewall, the lower sidewall extending from the lower end wall along the third axis; and an upper body portion including an upper end wall and an upper sidewall, the upper sidewall extending from the upper end wall towards the lower end wall along the third axis; and at least one clip supported on the body configured for releasable connection to the flange, the at least one clip including first and second clip members defining a receiving space therebetween configured to receive the flange such that the first and second clip members are positioned on opposite sides of the flange, wherein the lower sidewall is discontinuous in configuration, the lower sidewall including first and second segments positioned on opposite sides of the at least one clip.

2. The barrier of claim 1, wherein the upper end wall is spaced from the lower end wall along the third axis such that the upper end wall is positioned a first distance from the vehicle dash assembly and the lower end wall is positioned a second distance from the vehicle dash assembly, the second distance being less than the first distance.

3. The barrier of claim 1, wherein the lower sidewall includes a variable thickness that tapers inwardly towards the vehicle dash assembly.

4. The barrier of claim 1, wherein the first and second clip members are configured to engage the flange to restrict movement of the barrier along one or more of the first, second, and third axes.

5. The barrier of claim 4, wherein the second clip member is configured for resilient deflection from an initial configuration to a subsequent configuration such that the at least one clip applies a force to the flange to secure the at least one clip to the flange.

6. The barrier of claim 5, wherein the second clip member includes a first leg extending in a first direction and a second leg depending from the first leg, the second leg extending in a second direction transverse in relation to the first direction such that the second leg is deflectable in relation to the first leg.

7. The barrier of claim 6, wherein the first clip member includes an upper engagement member and a lower engagement member, the upper and lower engagement members defining beveled surfaces.

8. The barrier of claim 7, wherein the beveled surfaces extend along intersecting axes in correspondence with a contour defined by the flange to facilitate receipt of the flange within the receiving space.

9. A barrier connectable to a vehicle dash assembly including an HVAC opening defined by a flange, the barrier comprising:

a body configured to obstruct a flow of suds into the HVAC opening, the body including open upper and rear portions to allow for continued airflow through the HVAC opening, wherein the body defines a horizontal length extending along a first axis generally parallel in relation to the vehicle dash assembly, a vertical height extending along a second axis generally orthogonal in relation to the first axis, and a lateral width extending along a third axis generally orthogonal in relation to the first and second axes, the body comprising:

a lower body portion including a lower end wall and a lower sidewall, the lower sidewall extending from the lower end wall along the third axis;

an upper body portion including an upper end wall and an upper sidewall, the upper sidewall extending from the upper end wall towards the lower end wall along the third axis; and an internal stiffener extending inwardly from the upper end wall towards the HVAC opening in the vehicle dash assembly, wherein the internal stiffener and the lower sidewall define a channel configured to receive the flange to restrict movement of the flange along one or more of the first, second, and third axes; and at least one clip supported on the body configured for releasable connection to the flange, the at least one clip including first and second clip members defining a receiving space therebetween configured to receive the flange such that the first and second clip members are positioned on opposite sides of the flange.

10. The barrier of claim 9, wherein the channel is generally U-shaped in configuration.

11. The barrier of claim 10, wherein the channel defines opposite ends that taper outwardly towards the lower sidewall such that the ends of the channel receive the flange in an interference fit.

12. A method of inhibiting suds ingestion by a vehicle's HVAC system through an HVAC opening formed in a dash assembly of the vehicle, the method comprising:

releasably securing a barrier to a flange defining the HVAC opening to obstruct a flow of suds into the HVAC opening, the barrier including a body having an open upper portion and an open rear portion to maintain airflow through the HVAC opening, wherein securing the barrier to the flange includes connecting at least one clip to the flange, the at least one clip being supported on the body of the barrier, wherein connecting the at least one clip to the flange includes positioning first and second clip members on opposite sides of the flange such that the flange is positioned within a receiving space defined between the first and second clip members, wherein securing the barrier to the flange includes positioning the flange within an interior channel defined by the body, the channel extending along a perimeter of the barrier.

13. The method of claim 12, wherein positioning the flange within the interior channel includes creating an interference fit between the flange and tapered end portions of the channel.

* * * * *